United States Patent
Yang et al.

(10) Patent No.: US 11,349,920 B2
(45) Date of Patent: May 31, 2022

(54) METHODS, DEVICES AND COMPUTER READABLE MEDIUMS FOR DATA SYNCHRONIZATION

(71) Applicant: EMC IP Holding Company LLC, Hopkinton, MA (US)

(72) Inventors: Lifeng Yang, Beijing (CN); Jian Gao, Beijing (CN); Xinlei Xu, Beijing (CN); Ruiyong Jia, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/015,764

(22) Filed: Sep. 9, 2020

(65) Prior Publication Data

US 2020/0412802 A1    Dec. 31, 2020

Related U.S. Application Data

(62) Division of application No. 15/954,902, filed on Apr. 17, 2018, now Pat. No. 10,812,584.

(30) Foreign Application Priority Data

Apr. 17, 2017 (CN) .......................... 201710249894.1

(51) Int. Cl.
*H04L 29/08* (2006.01)
*G06F 15/173* (2006.01)
(Continued)

(52) U.S. Cl.
CPC .... *H04L 67/1095* (2013.01); *G06F 15/17331* (2013.01); *G06F 15/76* (2013.01); *H04L 67/2842* (2013.01)

(58) Field of Classification Search
CPC . H04L 67/1095; H04L 67/2842; H04L 29/08; H04L 67/568; G06F 15/76;
(Continued)

(56) References Cited

U.S. PATENT DOCUMENTS

| 7,409,525 | B1 | 8/2008 | Clark et al. |
| 7,475,207 | B2 | 1/2009 | Bromling et al. |

(Continued)

FOREIGN PATENT DOCUMENTS

CN      103763173 A      4/2014

*Primary Examiner* — Tonia L Dollinger
*Assistant Examiner* — Mehulkumar J Shah
(74) *Attorney, Agent, or Firm* — BainwoodHuang

(57) ABSTRACT

Embodiments of the present disclosure relate to methods, devices and computer readable mediums for data synchronization. A method comprises in response to receiving, at a first processor, a first request to synchronize data, initiating, to a second processor, a first remote direct memory access (RDMA) operation for transmitting the data between a first cache in the first processor and a second cache in the second processor. The method further comprises in response to completion of the first RDMA operation, writing the data into a first persistent storage device coupled to the first processor. The method further comprises transmitting, to the second processor, a command to instruct the second processor to commit the data to a second persistent storage device coupled to the second processor. Moreover, the method further comprises detecting, from the second processor, an acknowledgement for the command, the acknowledgement indicating that the data is synchronized between the first and second processors.

21 Claims, 6 Drawing Sheets

(51) Int. Cl.
   *G06F 15/76* (2006.01)
   *H04L 67/1095* (2022.01)
   *H04L 67/568* (2022.01)

(58) Field of Classification Search
   CPC .............. G06F 15/17331; G06F 15/173; G06F 11/1464; G06F 11/14; G06F 11/1469
   USPC .............................................. 709/212; 710/22
   See application file for complete search history.

(56) References Cited

U.S. PATENT DOCUMENTS

| | | | |
|---|---|---|---|
| 7,676,628 B1 | 3/2010 | Compton et al. | |
| 7,680,987 B1 | 3/2010 | Clark et al. | |
| 7,774,645 B1 | 8/2010 | Clark et al. | |
| 8,396,937 B1 * | 3/2013 | O'Krafka | G06F 13/28 |
| | | | 709/214 |
| 9,158,540 B1 | 10/2015 | Tzelnic et al. | |
| 9,286,261 B1 | 3/2016 | Tzelnic et al. | |
| 9,418,131 B1 | 8/2016 | Halevi et al. | |
| 9,606,870 B1 | 3/2017 | Meiri et al. | |
| 9,652,568 B1 | 5/2017 | Tzelnic et al. | |
| 9,959,074 B1 | 5/2018 | Shain et al. | |
| 10,055,161 B1 | 8/2018 | Meiri et al. | |
| 10,146,696 B1 | 12/2018 | Krigovski et al. | |
| 10,157,003 B1 | 12/2018 | Faibish et al. | |
| 10,216,652 B1 | 2/2019 | Kornfeld et al. | |
| 10,235,064 B1 | 3/2019 | Natanzon et al. | |
| 10,318,171 B1 | 6/2019 | Kornfeld et al. | |
| 10,635,348 B2 | 4/2020 | Yang et al. | |
| 10,698,772 B2 | 6/2020 | Hu et al. | |
| 10,705,753 B2 | 7/2020 | Kucherov et al. | |
| 10,719,238 B1 | 7/2020 | Espy et al. | |
| 10,783,078 B1 | 9/2020 | Meiri et al. | |
| 10,812,584 B2 | 10/2020 | Yang et al. | |
| 10,860,239 B2 | 12/2020 | Kucherov et al. | |
| 11,010,251 B1 | 5/2021 | Soukhman et al. | |
| 11,061,618 B1 | 7/2021 | Glimcher et al. | |
| 11,079,961 B1 | 8/2021 | Meiri et al. | |
| 11,079,969 B1 | 8/2021 | Glimcher et al. | |
| 11,093,161 B1 | 8/2021 | Chen et al. | |
| 11,126,361 B1 | 9/2021 | Shveidel et al. | |
| 11,144,232 B2 | 10/2021 | Chen et al. | |
| 11,144,461 B2 | 10/2021 | Soukhman et al. | |
| 2008/0109569 A1 | 5/2008 | Leonard et al. | |
| 2010/0211737 A1 | 8/2010 | Flynn et al. | |
| 2011/0022801 A1 | 1/2011 | Flynn | |
| 2013/0097369 A1 | 4/2013 | Talagala et al. | |
| 2015/0039712 A1 | 2/2015 | Frank et al. | |
| 2016/0124877 A1 * | 5/2016 | Hefty | G06F 13/28 |
| | | | 710/308 |
| 2016/0147710 A1 | 5/2016 | Franke et al. | |
| 2016/0344834 A1 * | 11/2016 | Das | G06F 11/3476 |
| 2017/0052723 A1 * | 2/2017 | Voigt | G06F 3/0679 |
| 2017/0329635 A1 | 11/2017 | Rathke | |
| 2018/0157429 A1 | 6/2018 | Venkat et al. | |
| 2018/0189193 A1 | 7/2018 | Bernat et al. | |

* cited by examiner

METHODS, DEVICES AND COMPUTER READABLE MEDIUMS FOR DATA SYNCHRONIZATION

RELATED APPLICATIONS

This application is a divisional of U.S. application Ser. No. 15/954,902, filed on Apr. 17, 2018, titled "METHODS, DEVICES AND COMPUTER READABLE MEDIUMS FOR DATA SYNCHRONIZATION", the contents and teachings of which are herein incorporated by reference in their entirety. Furthermore, U.S. application Ser. No. 15/954,902 claims priority to Chinese Patent Application Number CN201710249894.1, filed on Apr. 17, 2017 at the State Intellectual Property Office, China, titled "METHOD, APPARATUS AND COMPUTER-READABLE MEDIUM FOR DATA SYNCHRONIZATION" the contents of which were incorporated by reference in their entirety in that application.

FIELD

Embodiments of the present disclosure generally relate to the field of data storage, and more specifically relate to methods, devices and computer readable mediums for data synchronization.

BACKGROUND

To protect data from disasters, there is a need to implement replication techniques for data synchronization such that multiple copies of data can be stored securely. There are many factors involved in choosing the replication solution, such as amount of data that can be lost, time taken for recovery, distance between sites and so on. Conventional replication solutions are usually based on applications or files, or usually require additional facilities. Therefore, the conventional replication solutions usually cannot implement block-level remote replication.

To implement the block-level data replication between different sites, cache mirror among different sites needs to be implemented. Typically, in a storage system with a plurality of storage processors, a point-to-point local bus (such as a command interface) can be utilized to exchange data among the plurality of storage processors. Such local bus is usually built on peripheral component interconnect express (PCIe) switch fabric to implement local cache mirror through the PCIe physical interface. However, such implementation limits remote deployment of the plurality of storage processors. Besides, another potential problem of such implementation is that the point-to-point infrastructure cannot support expansion of the storage system.

SUMMARY

Embodiments of the present disclosure provide methods, devices and computer readable mediums for data synchronization.

In a first aspect of the present disclosure, there is provided a method of data synchronization. The method comprises: in response to receiving, at a first processor, a first request to synchronize data, initiating, to a second processor, a first remote direct memory access (RDMA) operation for transmitting the data between a first cache in the first processor and a second cache in the second processor; in response to completion of the first RDMA operation, writing the data into a first persistent storage device coupled to the first processor; transmitting, to the second processor, a command to instruct the second processor to commit the data to a second persistent storage device coupled to the second processor; and detecting, from the second processor, an acknowledgement for the command, the acknowledgement indicating that the data is synchronized between the first and second processors.

In a second aspect of the present disclosure, there is provided a method of data synchronization. The method comprises: in response to receiving, at a second processor and from a first processor, data transmitted via a first remote direct memory access (RDMA) operation, transmitting an acknowledgement for the first RDMA operation to the first processor; in response to receiving, from the first processor, a command for committing the data to a persistent storage device, transmitting an acknowledgement for the command to the first processor; and in response to the command, writing the data into the persistent storage device coupled to the second processor.

In a third aspect of the present disclosure, there is provided a device for data synchronization. The device comprises at least one processing unit and at least one memory. The at least one memory is coupled to the at least one processing unit and stores instructions for execution by the at least one processing unit. The instructions, when executed by the at least one processing unit, cause the device to perform acts, the acts comprising: in response to receiving a first request to synchronize data, initiating, to a second processor, a first remote direct memory access (RDMA) operation for transmitting the data between a first cache in a first processor and a second cache in the second processor; in response to completion of the first RDMA operation, writing the data into a first persistent storage device coupled to the first processor; transmitting, to the second processor, a command to instruct the second processor to commit the data to a second persistent storage device coupled to the second processor; and detecting, from the second processor, an acknowledgement for the command, the acknowledgement indicating that the data is synchronized between the first and second processors.

In a fourth aspect of the present disclosure, there is provided a device for data synchronization. The device comprises at least one processing unit and at least one memory. The at least one memory is coupled to the at least one processing unit and stores instructions for execution by the at least one processing unit. The instructions, when executed by the at least one processing unit, cause the device to perform acts, the acts comprising: in response to receiving, from a first processor, data transmitted via a first remote direct memory access (RDMA) operation, transmitting an acknowledgement for the first RDMA operation to the first processor; in response to receiving, from the first processor, a command for committing the data to a persistent storage device, transmitting an acknowledgement for the command, to the first processor; and in response to the command, writing the data into the persistent storage device coupled to a second processor.

In a fifth aspect of the present disclosure, there is provided a computer readable storage medium having computer readable program instructions stored thereon. The computer readable program instructions, when executed by a processing unit, cause the processing unit to perform the method according to the first aspect of the present disclosure.

In a sixth aspect of the present disclosure, there is provided a computer readable storage medium having computer readable program instructions stored thereon. The computer readable program instructions, when executed by a processing unit, cause the processing unit to perform the method according to the second aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF DRAWINGS

Through the following detailed description with reference to the accompanying drawings, the above and other objectives, features, and advantages of example embodiments of the present disclosure will become more apparent. In the example embodiments of present disclosure, the same reference signs usually represent the same components.

Throughout the drawings, the same or corresponding reference symbols are used to indicate the same or corresponding parts.

DETAILED DESCRIPTIONS

Figure 1:
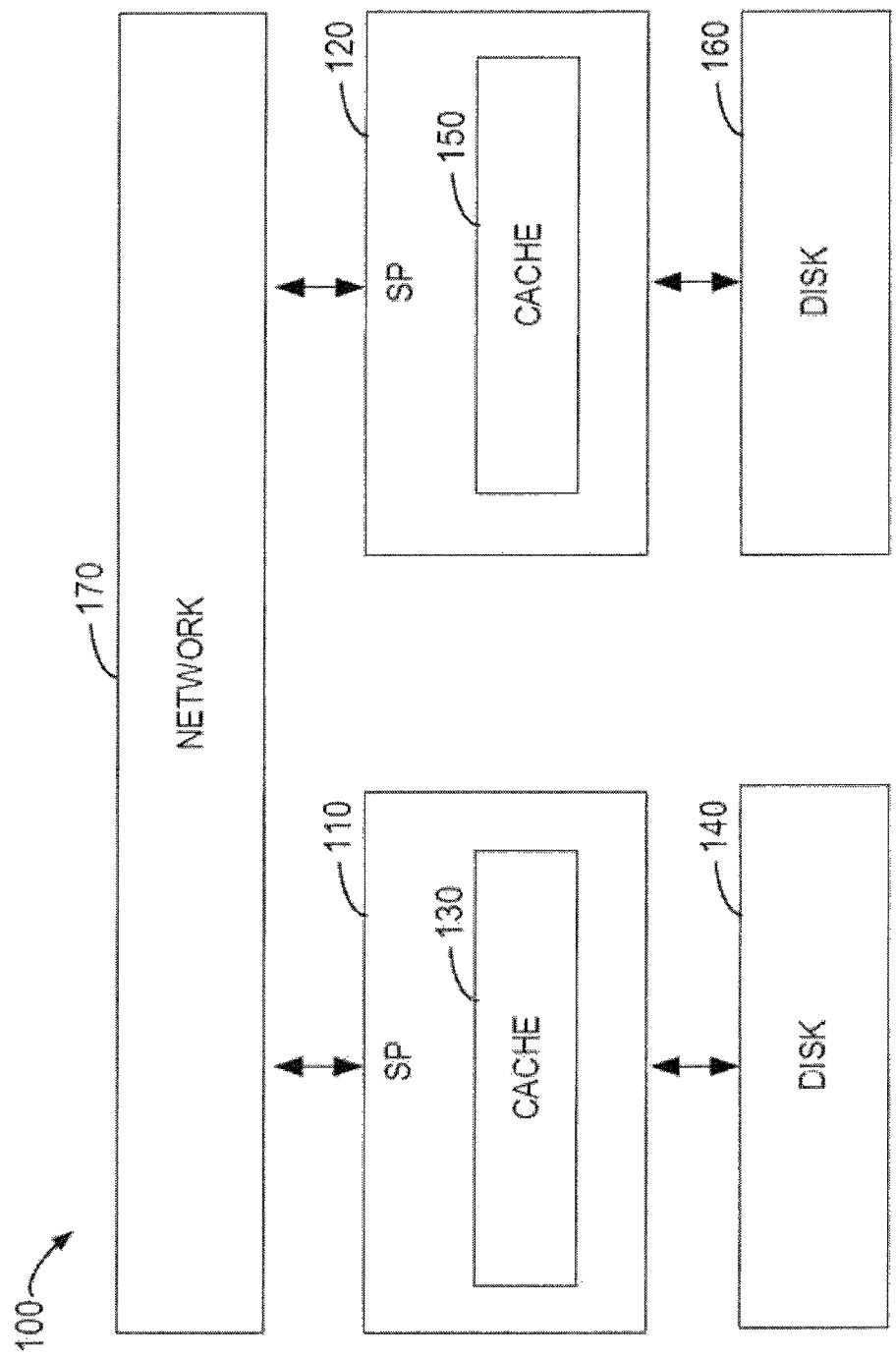
FIG. 1 illustrates an architecture diagram of a storage system 100 according to the embodiments of the present disclosure.

Preferred embodiments of the present disclosure will be described in the following text in greater detail with reference to the drawings. Although preferred embodiments of present disclosure are displayed in the drawings, it is to be understood that the present disclosure can be implemented in various manners, not limited to the embodiments illustrated herein. On the contrary, these embodiments are provided to make the subject matter described herein more thorough and more complete and convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one other embodiment." Terms "a first", "a second" and others can denote different or identical objects. The following text may also contain other explicit or implicit definitions.

As depicted above, the conventional data synchronization scheme is typically based on applications or files, which usually cannot implement the block level remote replication between different sites. Typically, in a storage system with a plurality of storage processors, cache mirror function constructed on the PCIe switch fabric can be implemented. However, such implementation limits remote deployment of the plurality of storage processors and lacks scalability.

In order to at least in part solve one or more of the above problems and other potential problems, example embodiments of the present disclosure propose a scheme for data synchronization, which enables interconnection of a plurality of storage processors through an Infiniband (abbreviated as "TB") switch fabric and enables data transmission among respective caches of the plurality of storage processors by means of enhanced remote direct memory access (RDMA) operations. Therefore, the scheme enables remote data synchronization with low latency, high throughput and scalability. Moreover, it further provides a remote cache commit mechanism to further enhance reliability of remote data synchronization.

FIG. 1 illustrates an architecture diagram of a storage system 100 according to the embodiments of the present disclosure. It is to be understood that the structure and functions of the storage system 100 as shown in FIG. 1 are only for purpose of illustration, without suggesting any limitations to the scope of the present disclosure. Embodiments of the present disclosure can be embodied in different structures and/or functions.

As shown in FIG. 1, the storage system 100 includes two storage processors (SPs, also called "storage nodes"), namely, SP 110 and SP 120. The SPs 110 and 120 may each have one or more modules. For example, as shown in FIG. 1, the SP 110 may have memories coupled thereto, such as a cache 130. The cache 130 can be used to store data temporarily into, for instance, a dynamic random access memory (DRAM). Besides, the SP 110 can be coupled with a disk 140 and the data temporarily stored in the cache 130 can be written into the disk 140 at a proper time. The disk 140 can be any non-volatile storage medium currently known or to be developed in the future, such as a magnetic disk, a solid state disk (SSD) or a magnetic disk array, and so on.

The SP 120 can be used to store copies of the data stored in the SP 110, for example, so as to protect the data from disasters. In some embodiments, the SP 120 can be deployed close to or away from the SP 110. For example, the SPs 110 and 120 can be deployed in different cities geographically. In order to implement remote data mirroring, the SP 120 can have the same structure as the SP 110. For example, the SP 120 may have one or more modules including a cache 150, and may be coupled with a disk 160. Similarly, the cache 150 can be used to store data temporarily into, for instance, a DRAM, and the data can be written into the disk 160 at a proper time. The disk 160 can be any non-volatile storage medium currently known or to be developed in the future, such as a magnetic disk, a solid state disk (SSD) or a magnetic disk array, and so on.

In the storage system 100, the SPs 110 and 120 can be interconnected by a network 170. In some embodiments, the network 170 may be an Infiniband switch fabric, also called Infiniband network. For example, the SPs 110 and 120 can be connected to a switch (not shown in FIG. 1) in the Infiniband network 170, respectively. As used herein, the "Infiniband" technique refers to a computer network communication standard for high-performance computation with very high throughput and very low latency. Infiniband technique is generally used for interconnection among computers and/or internal components of the computer. It can also be applied for direct interconnection or switched interconnection between a server and a respective storage system. Besides, Infiniband technique can also be employed for interconnection among different storage systems.

When the SPs 110 and 120 are interconnected via the Infiniband network, RDMA operations can be implemented therebetween. As used herein, an "RDMA operation" refers to direct memory access from a memory of one computer (such as the cache 130 in the SP 110) to a memory of another computer (such as the cache 150 in the SP 120) without involving an operating system of either of the two computers. The RDMA operation enables the network adapter to transmit data directly to or from the memory, thereby achieving zero-copy data transmission. Such transmission does not require the involvement of a central processing unit (CPU), an operating system or a switch, and thus can be performed in parallel with other system operations. When an RDMA read or write operation is performed, data can be transmitted to the network directly, thereby reducing latency and improving throughput.

Besides, RDMA can have multiple data transmission types, such as normal data sending and receiving similar to normal Transmission Control Protocol (TCP) sockets. In some implementations, the RDMA read and/or write operation enables directly placing data into a buffer of the other party relative to the initiator. In other words, in the storage system 100 as shown in FIG. 1, either of the SPs 110 and 120 can start the remote data synchronization operation through RDMA operations such that data is synchronized between the caches 130 and 150.

Figure 2:
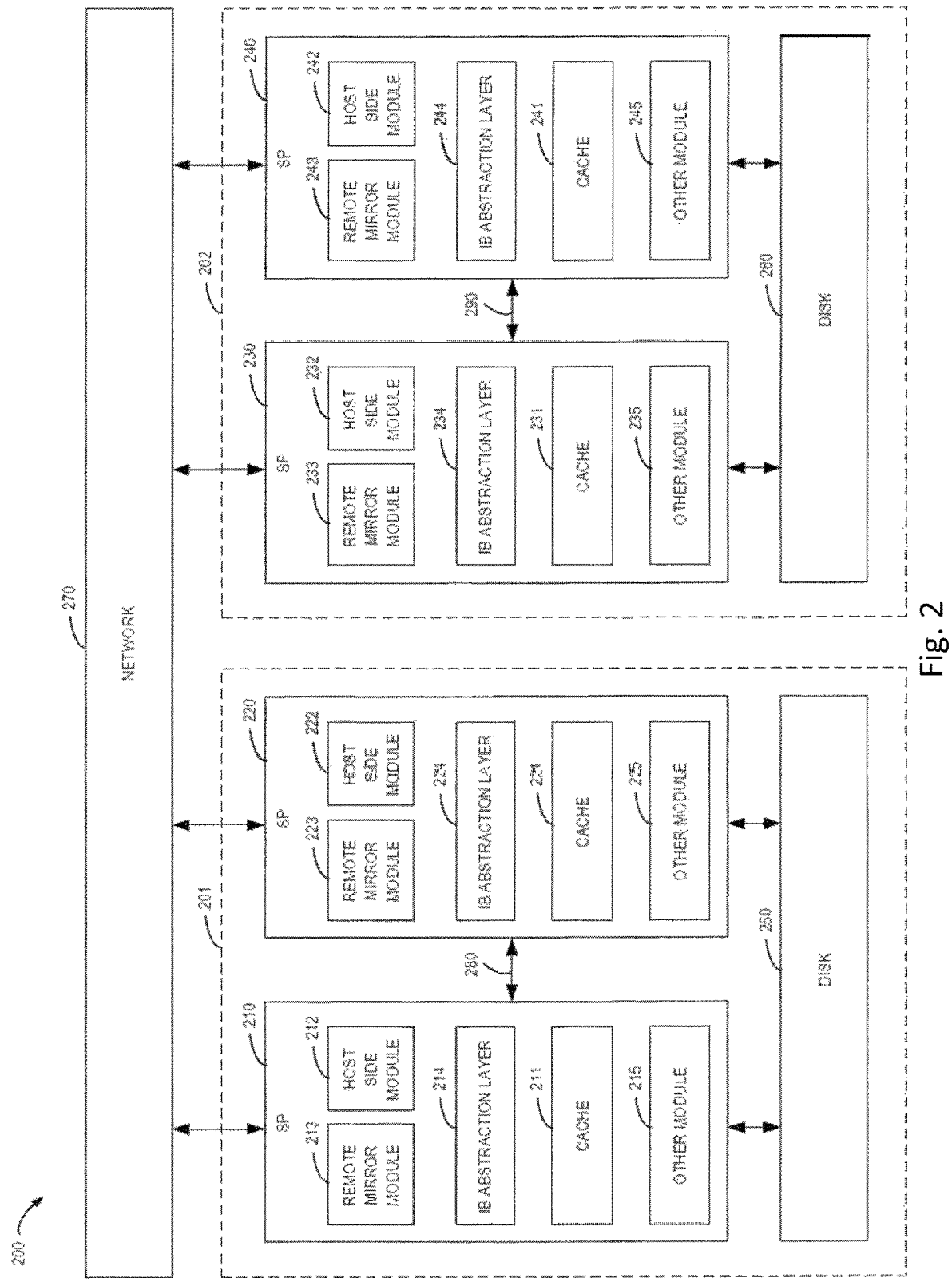
FIG. 2 illustrates an architecture diagram of a storage system 200 according to the embodiments of the present disclosure.

FIG. 2 illustrates an architecture diagram of a storage system 200 according to the embodiments of the present disclosure. The storage system 200 can be considered as a specific implementation of the storage system 100. It is to be understood that the structure and functions of the storage system 200 as shown in FIG. 2 are only for the purpose of illustration, without suggesting any limitations to the scope of the present disclosure. Embodiments of the present disclosure can be embodied in different structures and/or functions.

As shown in FIG. 2, storage system 200 may include a storage sub-system 201 and a storage sub-system 202 which can be interconnected via a network 270, such as an Infiniband network. The storage sub-system 201 and the storage sub-system 202 are mirrored by each other and used to store different copies of data, for example, to protect the data from disasters. In some embodiments, the storage sub-system 202 can be deployed close to or away from the storage sub-system 201. For example, the storage sub-system 201 and the storage sub-system 202 can be deployed in different cities geographically. In order to implement remote data mirroring, the storage sub-system 202 can have the same structure as the storage sub-system 201.

Taking the storage sub-system 201 as an example, it may include two SPs coupled to a shared disk 250, namely, SPs 210 and 220, which can be local mirrors for each other and can communicate with each other via a command interface 280. The command interface 280 may be, for example, an interface based on the PCIe, such that the SPs 210 and 220 can transmit commands and/or perform local data synchronization via the command interface 280.

Taking the SP 210 in the storage sub-system 201 for example, the SP 201 can have one or more modules. For example, as shown in FIG. 2, the SP 210 may have memories coupled thereto, such as a cache 211. The cache 211 can be used to store data temporarily in a DRAM, for example, and the data temporarily stored in the cache 211 can be written into the shared disk 250 at a proper time. The SP 210 may further include a host side module 212 for receiving an input/output (IO) command from a host (not shown in FIG. 2), processing the IO command and returning an IO acknowledgement to the host. The SP 210 may further include a remote mirror module 213, which may cause the SP 210 to be connected to the network 270 (such as a switch in the Infiniband network) for data synchronization with other SPs (such as SP 220, SP 230 and/or SP 240) via the network 270. In case that the network 270 is an Infiniband network, the SP 210 may further include an IB abstraction layer (Infiniband Verbs) 214 for providing RDMA function interfaces to the application. The IB abstraction layer can be divided into a data path and a control path, and can support management of resources for implementing the sending/receiving of the cached data. Furthermore, the SP 210 may further include one or more other modules 215. For example, when the shared disk 250 is implemented as a disk array, the one or more other modules 215 may include a corresponding disk array management module, an underlying driver module and so on. It is to be understood that the structure and functions of the SP 210 as shown in FIG. 2 are only for the purpose of illustration, without suggesting any limitations to the scope of the present disclosure.

The SPs 220 and 210 can be local mirrors for each other, and thus the SP 220 may have the same structure as the SP 210. For example, the SP 220 may include a cache 221, a host side module 222, a remote mirror module 223, an IB abstraction layer 224 and one or more other modules 225. The functions of the modules in the SP 220 can be the same as that of corresponding modules in the SP 210, which will not be repeated here.

The storage sub-system 202, as a remote mirror of the storage sub-system 201, can have the same structure as the storage sub-system 201. In other words, the SPs 230 and 240 in the storage sub-system 202 can have the similar structures and functions as the SPs 210 and 220 in the storage sub-system 201 respectively, which will not repeated here for the purpose of simplification.

Embodiments of the present disclosure will be further described below with reference to the storage system 100 as shown in FIG. 1 and/or the storage system 200 as shown in FIG. 2. As stated above, in order to implement block-level data synchronization among storage nodes in remote deployment, embodiments of the present disclosure propose implementing data transmission among respective memories of a plurality of storage nodes through enhanced RDMA operations via an Infiniband network.

Figure 3:
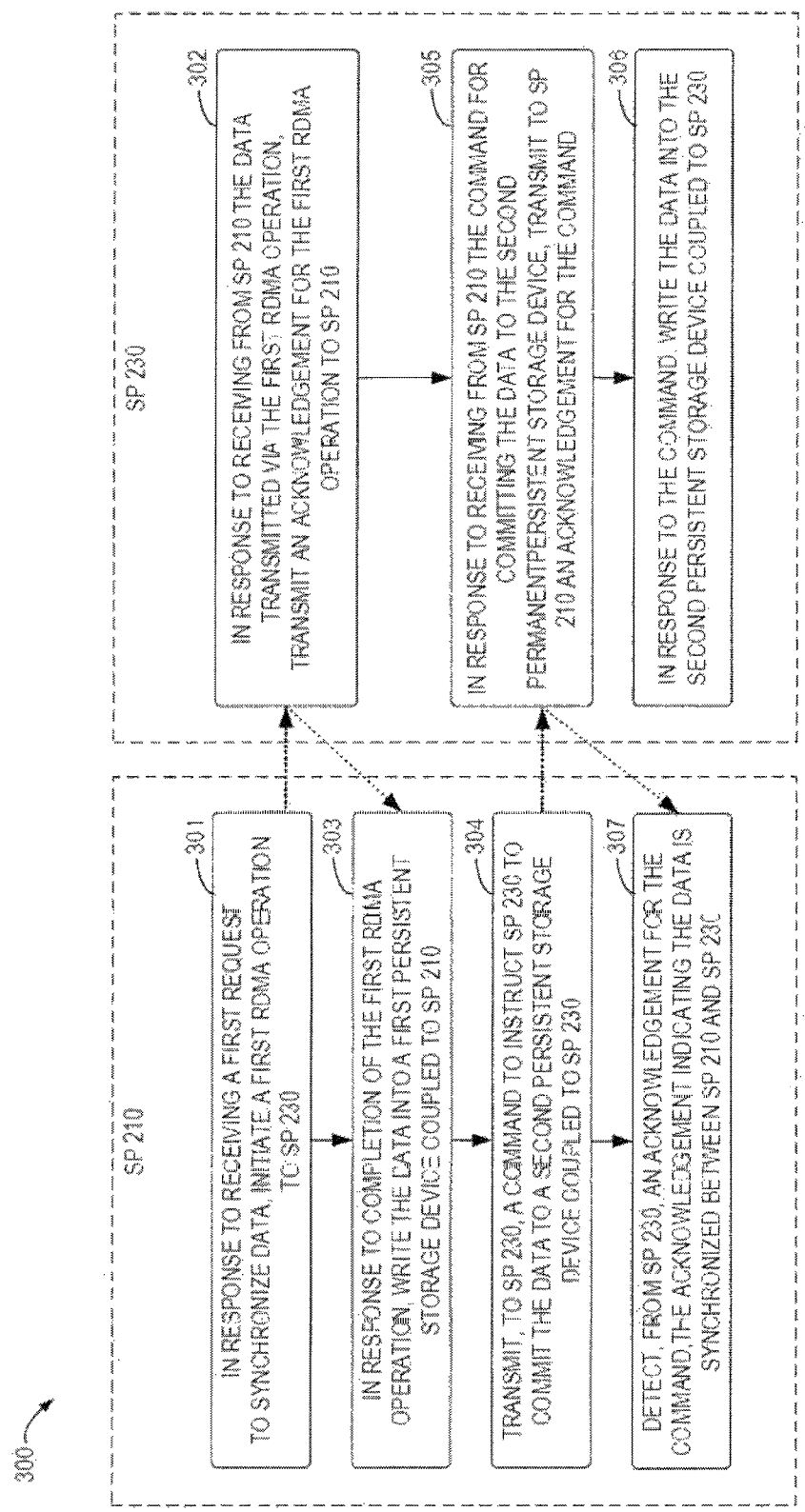
FIG. 3 illustrates a flowchart of a method 300 for data synchronization according to the embodiments of the present disclosure.

FIG. 3 illustrates a flowchart of a method 300 for data synchronization according to the embodiments of the present disclosure. Acts involved in method 300 will be described below with reference to the storage system 200 as shown in FIG. 2. For the ease of discussion, two SPs are involved in the depiction of the method 300. Without loss of generality, the method 300 will be described as below with reference to the SPs 210 and 230 as shown in FIG. 2, for example. In FIG. 3, for example, acts at the left side can be performed by the SP 210 while acts at the right side can be performed by the SP 230. In the following depiction, the SP 210 and a first processor can used interchangeably; the cache 211 and a first cache can be used interchangeably; the SP 230 and a second processor can be used interchangeably; and the cache 231 and a second cache can be used interchangeably.

It is to be understood that method 300 can also be implemented in the storage system 100 as shown in FIG. 1. For example, the acts at the left side in FIG. 3 can be performed by one of the SPs 110 and 120 while the acts at the right side can be performed by the other of the SPs 110 and 120. Besides, the method 300 may include additional acts not shown and/or omit some shown acts. The scope of the present disclosure is not limited in this respect.

At block 301, in response to receiving a first request to synchronize data, the SP 210 initiates a first RDMA operation to the SP 230. In some embodiments, the SP 210 can receive, from the host and via the host side module 212, an IO request to synchronize data. The first RDMA operation can be initiated via the network 270, such as the Infiniband network. The first RDMA operation can be used to transmit data between the cache 211 in the SP 210 and the cache 231 in the SP 230.

In some embodiments, the first RDMA operation can be initiated according to steps specified in RFC5666 ("Remote Direct Memory Access Transport for Remote Procedure Call" http://tools/ietf.org/html/rfc5666) protocol. For example, the first RDMA operation initiated by the SP 210 may be an RDMA write operation or an RDMA read operation. The RDMA write/read operation can also be called RDMA push/pull mode. The RDMA push mode means that data can be pushed to the cache 231 in the SP 230 directly via an RDMA write operation. The RDMA pull mode means that data can be obtained from the cache 231 in the SP 230 directly via an RDMA read operation. That is, when the initiator (for instance, the SP 210) initiates the first RDMA operation, data can be transmitted between the caches 211 and 231 without involvement of a CPU. For the purpose of illustration, an RDMA write operation is taken as an example of the first RDMA operation in the following depiction. However, it is to be understood that first RDMA operation can also be an RDMA read operation and the scope of the present disclosure is not limited in this respect.

As well known, the above RFC5666 protocol does not provide a mechanism for acknowledgement. For example, upon the SP 210 initiating an RDMA write operation to the SP 230, the SP 210 cannot learn whether data has been placed into the cache 231 in the SP 230 via the RDMA write operation. Regarding this problem, in some embodiments, the other side (such as the SP 230) relative to the initiator (such as the SP 210) of the RDMA operation can determine that whether the data transmitted via the RDMA operation is received in the cache and then transmit an acknowledgement to the initiator.

At block 302, in response to receiving from the SP 210 the data transmitted via the first RDMA operation, the SP 230 transmits an acknowledgement for the first RDMA operation to the SP 210. The acknowledgement may indicate that the data has been placed into the cache 231 in the SP 230.

In some embodiments, the mechanism for acknowledgement can be implemented in layers of a protocol, such as, RFC5666. For example, application programming interfaces for transmitting the acknowledgement can be added to RFC5666. In some embodiments, for example, if the first RDMA operation is an RDMA read operation, the SP 230 may optionally not transmit the acknowledgement for the RDMA read operation to the SP 210. In other words, in this case, block 302 can be omitted.

Besides, in some embodiments, blocks 301 and 302 can be performed more than once until all of the data to be synchronized (also called "dirty data") has been transmitted to respective caches. For example, the SP 210 may initiate, to the SP 230, a plurality of RDMA write operations and/or a plurality of RDMA read operations. The SP 230 can transmit to the SP 210 respective acknowledgements for the plurality of RDMA operations.

At block 303, in response to completion of the first RDMA operation, the SP 210 writes the data into a first persistent storage device coupled to the SP 210. For example, the first persistent storage device can be the shared disk 250 coupled with the SP 210.

In some embodiments, the SP 210 can determine that the first RDMA operation is completed in response to receiving from the SP 230 the acknowledgement for the first RDMA operation. In some embodiments, for example, when the first RDMA operation is an RDMA read operation, the SP 210 can determine that the first RDMA operation is completed in response to obtaining the desired data from the cache 231 in the SP 230.

In some embodiments, by committing the data to the first persistent storage device, SP 210 enables all of the dirty data to be recovered (namely, replayed) in the event of a power failure or SP 210 crashing.

At block 304, the SP 210 transmits a command to the SP 230, so as to instruct the SP 230 to commit the data to a second persistent storage device coupled to SP 230. For example, the second persistent storage device can be the shared disk 260 coupled to the SP 230.

In some embodiments, the command for committing the data can be transmitted via a second RDMA operation. For example, the SP 210 can transmit an RDMA write operation to the SP 230 such that the command for committing the data is transmitted to the cache 231 in the SP 230. The manner in which the SP 210 initiates the second RDMA operation is similar to the manner in which it initiates the first RDMA operation, which will be not further described in detail here.

At block 305, in response to receiving from the SP 210 the command for committing the data to the second persistent storage device, the SP 230 transmits to the SP 210 an acknowledgement for the command.

In some embodiments, for example, when the command for committing the data is transmitted via the RDMA write operation, the SP 230 can transmit to the SP 210 the acknowledgement for the RDMA write operation in a manner similar to that as shown in block 302. For example, the acknowledgement can indicate that the command for committing the data has been placed into the cache 231 in the SP 230 for processing.

At block 306, in response to the command, the SP 230 writes the data into the second persistent storage device coupled to the SP 230. In some embodiments, by committing the data into the first persistent storage device, the SP 230 enables all of the dirty data to be recovered (namely, replayed) in the event of a power failure or SP 230 crashing. In this manner, embodiments of the present disclosure can further improve reliability of remote data synchronization.

At block 307, the SP 210 detects, from the SP 230, the acknowledgement for the command. In some embodiments, in response to receiving the acknowledgement from the SP 230, the SP 210 can determine that the data is synchronized between the SPs 210 and 230. For example, the SP 210 can set a state associated with the cache 211 as "synchronized."

As can be seen from the above depiction, embodiments of the present disclosure can interconnect a plurality of storage processors with an IB switch fabric, and enable data transmission among respective caches of the plurality of storage processors via enhanced RDMA operations (for example, RDMA reading/write operations with a mechanism for acknowledgement). Therefore, embodiments of the present disclosure enable remote data synchronization with low latency, high throughput and scalability. Besides, embodiments of the present disclosure can provide a remote cache commit mechanism to further enhance reliability of remote data synchronization.

Figure 4:
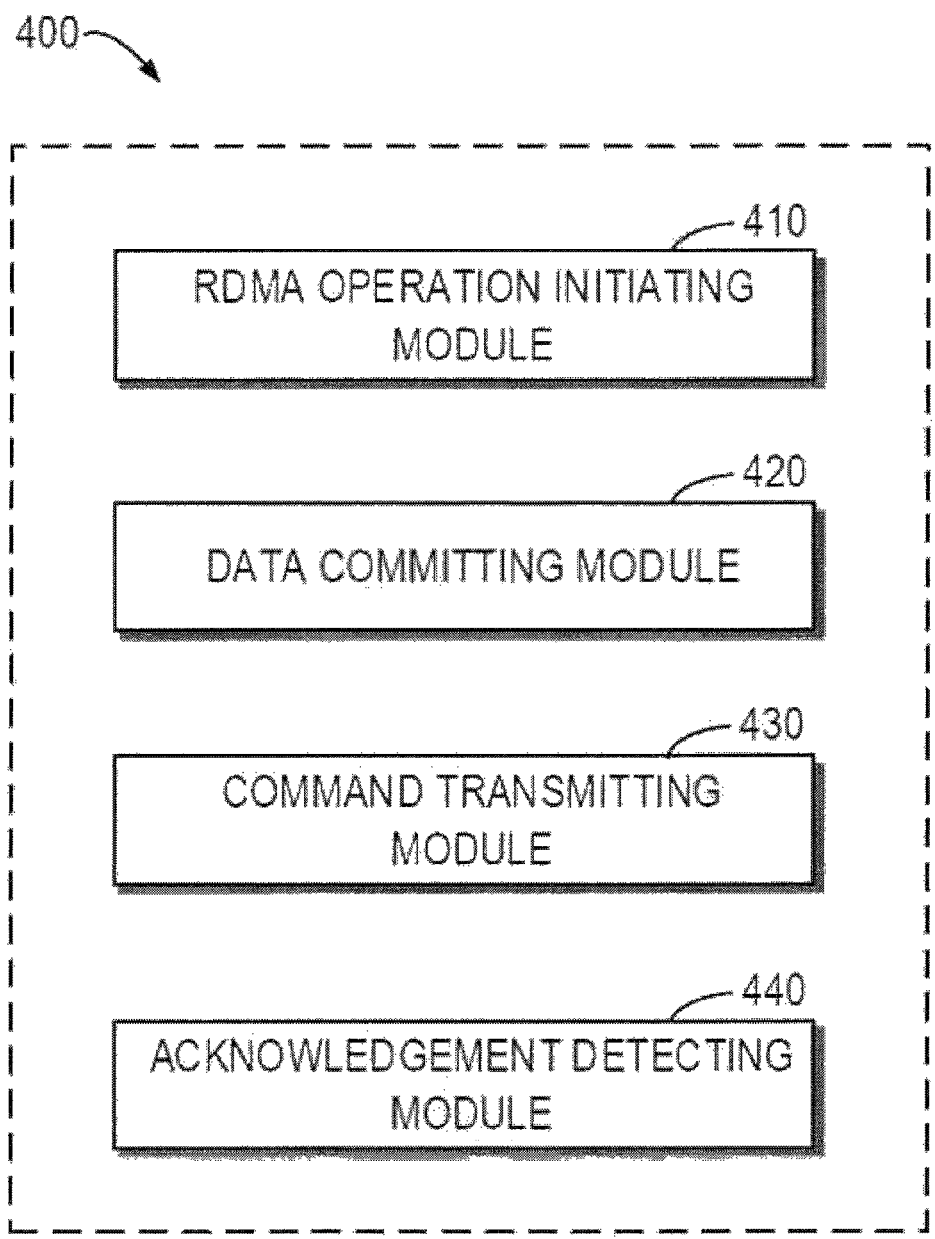
FIG. 4 illustrates a block diagram of a device 400 for data synchronization according to the embodiments of the present disclosure.

FIG. 4 illustrates a block diagram of an apparatus 400 for data synchronization according to the embodiments of the present disclosure. For example, any of the SPs 110-120 as shown in FIG. 1 and the SPs 210-240 as shown in FIG. 2 that acts as the active party of data synchronization can be implemented by the apparatus 400. As shown in FIG. 4, the apparatus 400 may comprise an RDMA operation initiating module 410 which is configured to, in response to receiving a first request to synchronize data, initiate to a second processor a first remote direct memory access (RDMA) operation for transmitting the data between a first cache in a first processor and a second cache in the second processor. The apparatus 400 may further comprise a data committing module 420 which is configured to, in response to completion of the first RDMA operation, write the data into a first persistent storage device coupled to the first processor. The apparatus 400 may further comprise a command transmitting module 430 which is configured to transmit, to the second processor, a command to instruct the second processor to commit the data to a second persistent storage device coupled to the second processor. Moreover, the apparatus 400 may further comprise an acknowledgement detecting module 440 which is configured to detect, from the second processor, an acknowledgement for the command, the acknowledgement indicating that the data is synchronized between the first and second processors.

Figure 5:
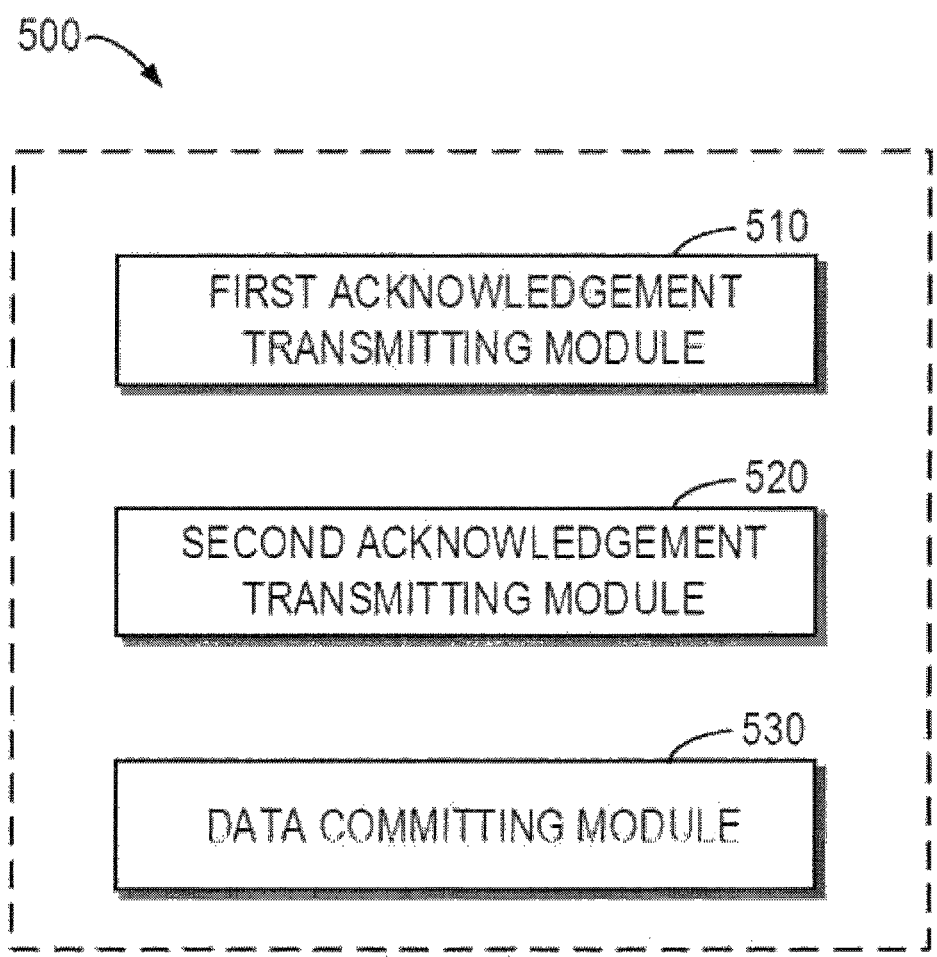
FIG. 5 illustrates a block diagram of a device 500 for data synchronization according to the embodiments of the present disclosure.

FIG. 5 illustrates a block diagram of an apparatus 500 for data synchronization according to the embodiments of the present disclosure. For example, any of the SPs 110-120 as shown in FIG. 1 and the SPs 210-240 as shown in FIG. 2 that acts as the passive party of data synchronization can be implemented by the apparatus 500. As shown in FIG. 5, the apparatus 500 may comprise a first acknowledgement transmitting module 510 which is configured to, in response to receiving, from a first processor, data transmitted via a first remote direct memory access (RDMA) operation, transmitting an acknowledgement for the first RDMA operation to the first processor. The apparatus 500 may further comprise a second acknowledgement transmitting module 520 which is configured to, in response to receiving, from the first processor, a command for committing the data to a persistent storage device, transmitting an acknowledgement for the command, to the first processor. In addition, the apparatus 500 may further comprise a data committing module 530 which is configured to, in response to the command, write the data into the persistent storage device coupled to a second processor.

For the sake of clarity, some optional modules of the apparatus 400 and/or 500 are not shown in FIGS. 4 and/or 5. However, it is to be understood that various features as described with reference to FIGS. 1-3 are likewise applicable to the apparatus 400 and/or 500. Besides, respective modules in the apparatus 400 and/or 500 may be hardware modules or software modules. For example, in some embodiments, the apparatus 400 and/or 500 may be partially or completely implemented in software and/or firmware, e.g., implemented as a computer program product embodied on a computer readable medium. Alternatively or additionally, the apparatus 400 and/or 500 may be partially or completely implemented based on hardware, for example, implemented as an integrated circuit (IC) chip or an application specific integrated circuit (ASIC), a system on chip (SOC), a field programmable gate array (FPGA) and so on. The scope of the present invention is not limited in this aspect.

Figure 6:
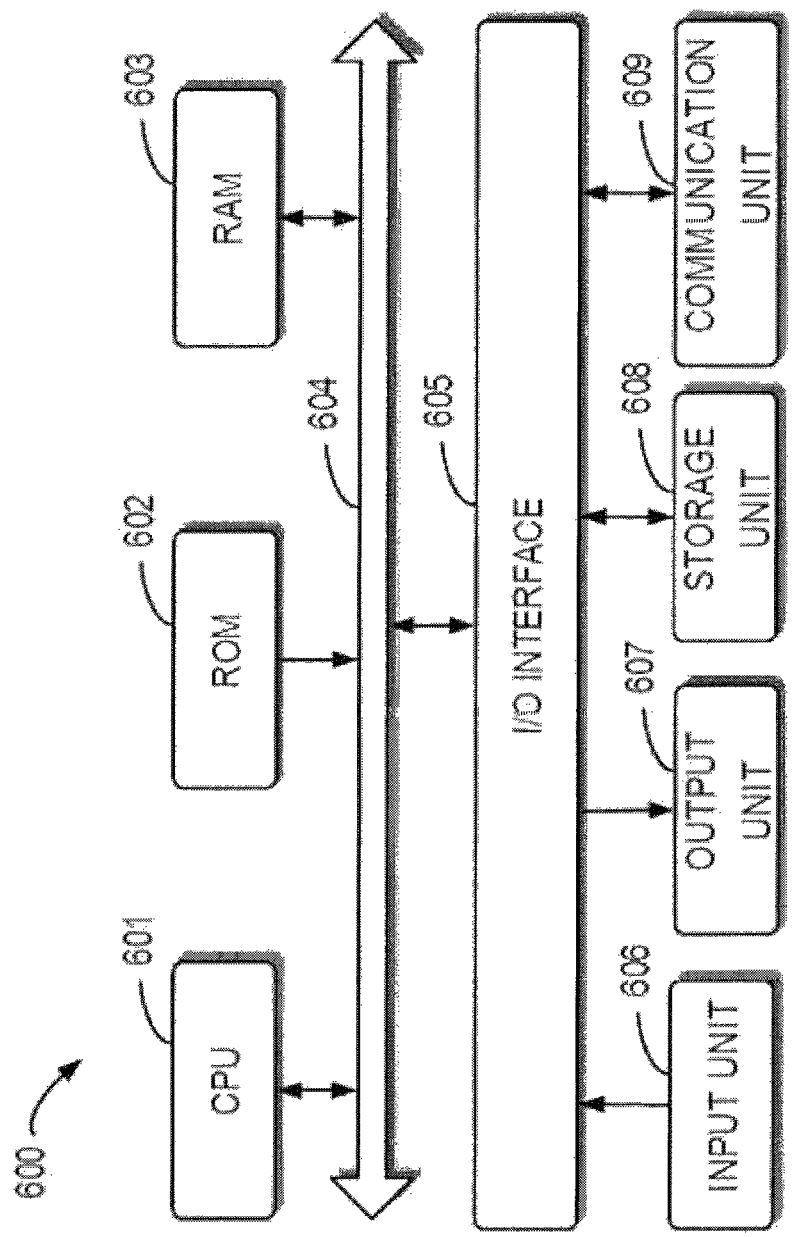
FIG. 6 illustrates a schematic block diagram of an illustrative device 600 applicable to implement embodiments of the present disclosure.

FIG. 6 illustrates a schematic diagram of an example device 600 for implementing the embodiments of the present disclosure. For example, any of the SPs 110-120 as shown in FIG. 1 and the SPs 210-240 as shown in FIG. 2 can be implemented by the device 600. As illustrated in the FIG. 6, the device 600 comprises a central processing unit (CPU) 601 which can execute various appropriate actions and processing based on the computer program instructions stored in a read-only memory (ROM) 602 or the computer program instructions loaded into a random access memory (RAM) 603 from a storage unit 608. The RAM 603 also stores all kinds of programs and data required by operating the storage device 600. CPU 601, ROM 602 and RAM 603 are connected to each other via a bus 604 to which an input/output (I/O) interface 605 is also connected.

A plurality of components in the apparatus 600 are connected to the I/O interface 605, comprising: an input unit 606, such as keyboard, mouse and the like; an output unit 607, such as various types of displays, loudspeakers and the like; a storage unit 608, such as magnetic disk, optical disk and the like; and a communication unit 609, such as network card, modem, wireless communication transceiver and the like. The communication unit 609 allows the apparatus 600 to exchange information/data with other devices through computer networks such as Internet and/or various telecommunication networks.

Each procedure and processing as described above, such as the method 200, 300 and/or 400, can be executed by the processing unit 601. For example, in some embodiments, the method 200, 300 and/or 400 can be implemented as computer software programs, which are tangibly included in a machine-readable medium, such as the storage unit 608. In some embodiments, the computer program can be partially or completely loaded and/or installed to the device 600 via the ROM 602 and/or the communication unit 609. When the computer program is loaded to the RAM 603 and executed by the CPU 601, one or more steps of the above described method 200, 300 and/or 400 are implemented.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of data synchronization, comprising:
in response to a first processor receiving a request to synchronize data, receiving, at a second processor, initiation of a first remote direct memory access (RDMA) operation from the first processor, the first RDMA operation including either an RDMA write operation that is configured to cause the data to be written from a first cache in the first processor into a second cache in the second processor, or an RDMA read operation that is configured to cause the data to be read from the second cache into the first cache;
in response to the first processor writing the data from the first cache into a first persistent storage device coupled to the first processor, receiving, from the first processor, a commit command configured to cause the second processor to write the data from the second cache to a second persistent storage device coupled to the second processor; and
in response to the commit command from the first processor, writing the data from the second cache into the second persistent storage device coupled to the second processor.

2. The method according to claim 1, wherein the first RDMA operation is initiated via a network connecting the first and second processors, and the network is an Infiniband network.

3. The method according to claim 1, wherein the first RDMA operation is an RDMA write operation and the data is transmitted via the RDMA write operation from the first cache in the first processor to the second cache in the second processor.

4. The method according to claim 2, wherein the commit command is transmitted via a second RDMA operation and the second RDMA operation is initiated by the first processor via the network.

5. The method according to claim 1, further comprising:
    transmitting an acknowledgement for the first RDMA operation to the first processor.

6. The method according to claim 1, further comprising:
    transmitting an acknowledgement to the first processor, the acknowledgement indicating that the second processor has written the data from the second cache into the second persistent storage device.

7. The method according to claim 1, wherein the second processor includes a central processing unit (CPU) which is constructed and arranged to execute a data storage operating system; and wherein the method further comprises:
    receiving, as part of the first RDMA operation, the data into the second cache from the first processor without involvement of the CPU.

8. The method according to claim 1, wherein the second processor includes a central processing unit (CPU) which is constructed and arranged to execute a data storage operating system; and wherein the method further comprises:
    providing, as part of the first RDMA operation, the data from the second cache to the first processor without involvement of the CPU.

9. The method according to claim 1, wherein the first processor and the second processor reside in different geographic areas and maintain respective copies of the same data to provide remote data mirroring over an Infiniband network.

10. A device for data synchronization, comprising:
    at least one processing unit; and
    at least one memory coupled to the at least one processing unit and storing instructions for execution by the at least one processing unit, the instructions, when executed by the at least one processing unit, causing the device to perform acts comprising:
    in response to a first processor receiving a request to synchronize data, receiving initiation of a first remote direct memory access (RDMA) operation from the first processor, the first RDMA operation including either an RDMA write operation that is configured to cause the data to be written from a first cache in the first processor into a second cache of a second processor, or an RDMA read operation that is configured to cause the data to be read from the second cache into the first cache;
    in response to the first processor writing the data from the first cache into a first persistent storage device coupled to the first processor, receiving, from the first processor, a commit command configured to cause the second processor to write the data to a second persistent storage device coupled to the second processor; and
    in response to the commit command from the first processor, writing the data from the second cache into the persistent storage device coupled to the second processor.

11. The device according to claim 10, wherein the first RDMA operation is initiated via a network connecting the first and second processors, and the network is an Infiniband network.

12. The device according to claim 10, wherein the first RDMA operation is an RDMA write operation and the data is transmitted via the RDMA write operation from the first cache in the first processor to the second cache in the second processor.

13. The device according to claim 11, wherein the commit command is transmitted via a second RDMA operation and the second RDMA operation is initiated by the first processor via the network.

14. The device according to claim 10, wherein acts further include: transmitting an acknowledgement for the first RDMA operation to the first processor.

15. The device according to claim 10, wherein acts further include: transmitting an acknowledgement to the first processor, the acknowledgement indicating that the second processor has written the data from the second cache into the second persistent storage device.

16. The device according to claim 10, wherein the second processor includes a central processing unit (CPU) which is constructed and arranged to execute a data storage operating system; and wherein the acts further include: receiving, as part of the first RDMA operation, the data into the second cache from the first processor without involvement of the CPU.

17. The device according to claim 10, wherein the second processor includes a central processing unit (CPU) which is constructed and arranged to execute a data storage operating system; and wherein the acts further include: providing, as part of the first RDMA operation, the data from the second cache to the first processor without involvement of the CPU.

18. A computer program product having a non-transitory computer readable medium which stores a set of instructions to perform data synchronization; the set of instructions, when carried out by a second processor, causing the second processor to perform a method of:
    in response to a first processor receiving a request to synchronize data, receiving initiation of a first remote direct memory access (RDMA) operation from the first processor, the first RDMA operation including either an RDMA write operation that is configured to cause the data to be written from a first cache in the first processor into a second cache in the second processor, or an RDMA read operation that is configured to cause the data to be read from the second cache into the first cache;
    in response to the first processor writing the data from the first cache into a first persistent storage device coupled to the first processor, receiving a commit command from the first processor, the commit command being configured to cause the second processor to write the data from the second cache into to a second persistent storage device coupled to the second processor; and
    in response to the commit command from the first processor, writing the data from the second cache into to the second persistent storage device.

19. The computer program product according to claim 18, wherein the method further includes: transmitting a first acknowledgement for the first RDMA operation to the first processor; and transmitting a second acknowledgement to the first processor, the second acknowledgement indicating that the second processor has written the data from the second cache into the second persistent storage device.

20. The computer program product according to claim 18, wherein the second processor includes a central processing unit (CPU) which is constructed and arranged to execute a data storage operating system; and wherein the method further includes: receiving, as part of the first RDMA operation, the data into the second cache from the first processor without involvement of the CPU.

21. The computer program product according to claim 18, wherein the second processor includes a central processing unit (CPU) which is constructed and arranged to execute a data storage operating system; and wherein the method further includes: providing, as part of the first RDMA operation, the data from the second cache to the first processor without involvement of the CPU.

* * * * *